United States Patent
Ahn et al.

(10) Patent No.: US 8,459,617 B2
(45) Date of Patent: Jun. 11, 2013

(54) DISC ASSEMBLY OF AIR CLEANING HUMIDIFIER

(71) Applicant: Samsung Electronics Co., Ltd., Suwon-si (KR)

(72) Inventors: Jong Chul Ahn, Seoul (KR); Jun Eui Chang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/673,405

(22) Filed: Nov. 9, 2012

(65) Prior Publication Data

US 2013/0062791 A1 Mar. 14, 2013

Related U.S. Application Data

(62) Division of application No. 12/805,589, filed on Aug. 6, 2010.

(30) Foreign Application Priority Data

Oct. 12, 2009 (KR) .............................. 10-2009-96647

(51) Int. Cl.
*B01F 3/04* (2006.01)

(52) U.S. Cl.
USPC ............................................ 261/91; 261/92

(58) Field of Classification Search
USPC .................... 261/28, 30, 91, 92; 428/411.1
See application file for complete search history.

(56) References Cited

U.S. PATENT DOCUMENTS

| | | | | | |
|---|---|---|---|---|---|
| 1,704,663 | A | * | 3/1929 | Noden | 261/92 |
| 2,687,998 | A | * | 8/1954 | McLeary | 210/167.25 |
| 3,171,600 | A | * | 3/1965 | Eckey | 239/220 |
| 3,761,059 | A | * | 9/1973 | Rothert et al. | 366/316 |
| 3,886,074 | A | * | 5/1975 | Prosser | 210/150 |
| 4,330,408 | A | * | 5/1982 | McClure | 210/619 |
| 6,832,753 | B1 | * | 12/2004 | Huang | 261/28 |
| 6,884,284 | B1 | * | 4/2005 | Jensen | 96/281 |
| 2011/0049732 | A1 | * | 3/2011 | Kim | 261/92 |
| 2011/0084414 | A1 | * | 4/2011 | Ahn et al. | 261/91 |
| 2011/0084415 | A1 | * | 4/2011 | Kim et al. | 261/92 |

OTHER PUBLICATIONS

U.S. Appl. No. 12/805,589, filed Aug. 6, 2012, Jong Chul Ahn et al., Samsung Electronics Co., Ltd.
Notice of Allowance issued in copending U.S. Appl. No. 12/805,589 mailed Jan. 22, 2013.

* cited by examiner

*Primary Examiner* — Charles Bushey
(74) *Attorney, Agent, or Firm* — Staas & Halsey LLP

(57) ABSTRACT

A disc assembly of an air cleaning humidifier includes a disc member provided with assembly parts formed by cutting parts of the disc member; first and second plate members respectively disposed at both sides of the disc member; at least one fixing member inserted into a corresponding one of the assembly parts between the first and second plate members to fix the disc member; and water storage parts formed in the at least one fixing member.

7 Claims, 10 Drawing Sheets

DISC ASSEMBLY OF AIR CLEANING HUMIDIFIER

CROSS-REFERENCE TO RELATED APPLICATIONS

This application is a divisional of U.S. application Ser. No. 12/805,589, filed on Aug. 6, 2012, which claims the benefit of Korean Patent Application No. 10-2009-0096647, filed on Oct. 12, 2009 in the Korean Intellectual Property Office, the disclosure of which is incorporated herein by reference.

BACKGROUND

1. Field

Embodiments relate to an air cleaning humidifier having a disc assembly to perform a purifying function and a humidifying function of indoor air, and a disc assembly thereof.

2. Description of the Related Art

In general, humidifiers are used to maintain indoor humidity at a proper level and prevent various respiratory diseases.

Humidifiers are operated by various humidifying methods. Among humidifiers operated by various humidifying methods, an evaporative type humidifier having a disc assembly, in which air purified by an air purification filter is discharged to the outside through discharge holes via a disc assembly soaked in water so as to achieve humidification, has recently been proposed.

In the above constitution, when the disc assembly is rotated, the disc assembly passes through a designated position of the humidifier that performs most of the evaporation, so that little water remains in the disc assembly and thus the disc assembly does not perform humidification any more. That is, when a part of the disc assembly passes through a designated height of the humidifier, it provides no assistance to humidification and only generates ineffective resistance.

SUMMARY

Therefore, it is one aspect to provide an air cleaning humidifier, in which a humidity amount is increased through fixing members of a disc assembly fixing discs, and a disc assembly thereof.

Additional aspects of the invention will be set forth in part in the description which follows and, in part, will be apparent from the description, or may be learned by practice of the invention.

In accordance with one aspect, an air cleaning humidifier includes a main body, a tub provided in the main body, an air blower fan to generate an air current in the tub, and a disc assembly rotated under the condition that a part of the disc assembly is disposed in the tub, wherein the disc assembly includes a disc member provided with assembly parts formed by cutting parts of the disc member, at least one plate member disposed at one side of the disc member, and at least one fixing member formed on at least one plate member to fix the assembly parts, and each of the at least one fixing member includes a protrusion part respectively inserted into the assembly parts, and a water storage part formed by cutting the protrusion part.

The water storage part may include a water storage space to store water contained in the tub, and an entrance and exit hole, through which water contained in the tub enters the water storage space and then is discharged at a designated height to the outside of the water storage space.

The assembly parts may include recess parts indented on the edge of the disc member, and the at least one fixing member may include first fixing members connected to the recess parts.

The assembly parts may include hole parts formed on the surface of the disc member, and the at least one fixing member may include second fixing members connected to the hole parts.

The at least one plate member may include first and second plates disposed at both sides of the disc member, and the at least one fixing member may be formed integrally with any one of the first plate member and the second plate member and be screw-connected to the other one of the first plate member and the second plate member.

The disc member may be formed by stacking a plurality of discs.

The entrance and exit hole may have a length corresponding to the length of the assembly parts.

The air cleaning humidifier may further include a driving unit to transmit rotary force driving the disc assembly.

A gear part may be formed integrally with any one of the first plate member and the second plate member, and be connected to the driving unit and thus rotated.

The disc assembly may be disposed in the main body such that a center of rotation of the disc assembly is the same as a center of rotation of the air blower fan and a thickness of the disc assembly is overlapped with a thickness of the air blower fan.

In accordance with a further aspect, an air cleaning humidifier includes a main body, a tub provided in the main body, an air blower fan to generate an air current in the tub, and a disc assembly rotated under the condition that a part of the disc assembly is disposed in the tub, and surrounding at least a part of the air blower fan, wherein the disc assembly includes a ring-shaped disc member formed by stacking a plurality of discs, a first plate member and a second plate member respectively disposed at both sides of the disc member, and fixing members to fix the disc member between the first plate member and the second plate member, and each of the fixing members includes a water storage part to lift up water contained in the tub to a designated height and then to discharge the water to the disc member according to the rotation of the disc assembly.

The water storage part may include any one of a first water storage part corresponding to a recess part indented on the edge of the disc member, and a second water storage part corresponding to a hole part formed on the surface of the disc member.

The water storage part may be formed in a size corresponding to the thickness of the disc member.

In accordance with another aspect, a disc assembly of an air cleaning humidifier includes a disc member provided with assembly parts formed by cutting parts of the disc member, first and second plate members respectively disposed at both sides of the disc member, at least one fixing member inserted into a corresponding one of the assembly parts between the first and second plate members to fix the disc member, and water storage parts formed in the at least one fixing member.

Each of the assembly parts may include at least one of a recess part indented on the edge of the disc member, and a hole part formed on the surface of the disc member, and each of the at least one fixing member may include at least one of a first fixing member corresponding to the recess part, and a second fixing member corresponding to the hole part.

The water storage parts may include a first water storage part formed in the first fixing member, and a second water storage part formed in the second fixing member.

In accordance with another aspect, a disc assembly of an air cleaning humidifier includes a ring-shaped disc member formed by stacking a plurality of discs, first and second plate members respectively disposed at both sides of the disc member, at least one fixing member formed integrally with any one of the first and second plate members to fix the disc member, water storage parts formed in the at least one fixing member, and entrance and exit holes, through which water respectively enters and leaves the water storage parts.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
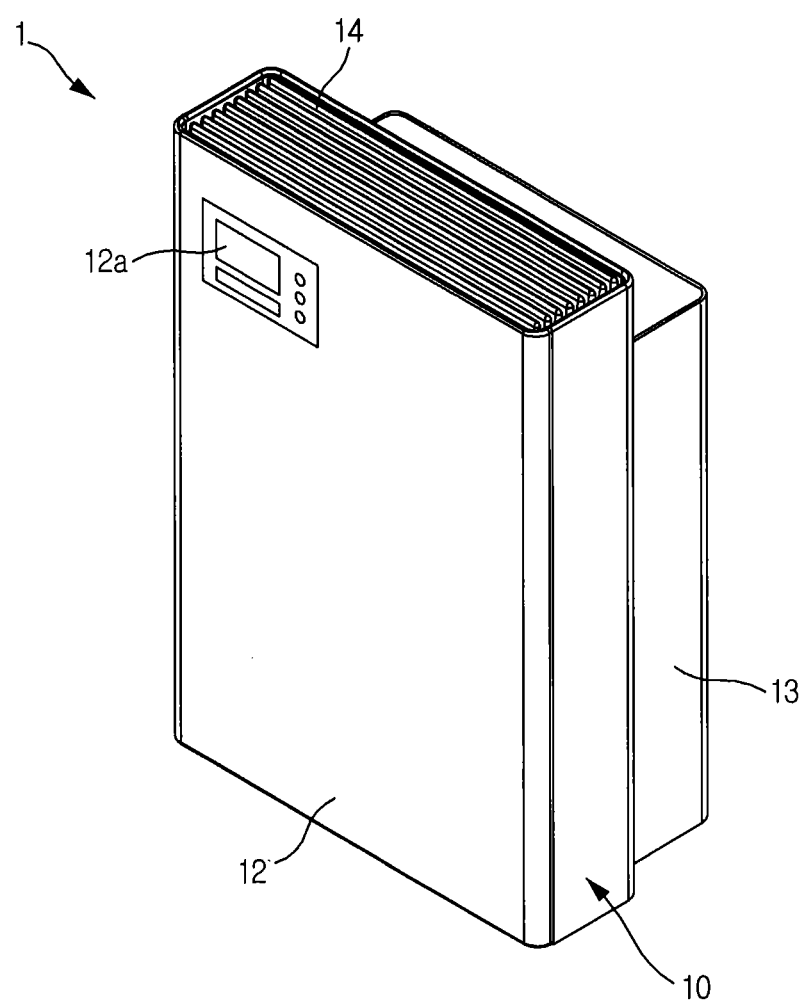
FIG. 1 is a perspective view illustrating the external appearance of an air cleaning humidifier in accordance with one embodiment.

Reference will now be made in detail to the embodiments of the present invention, examples of which are illustrated in the accompanying drawings, wherein like reference numerals refer to like elements throughout.

Figure 2:
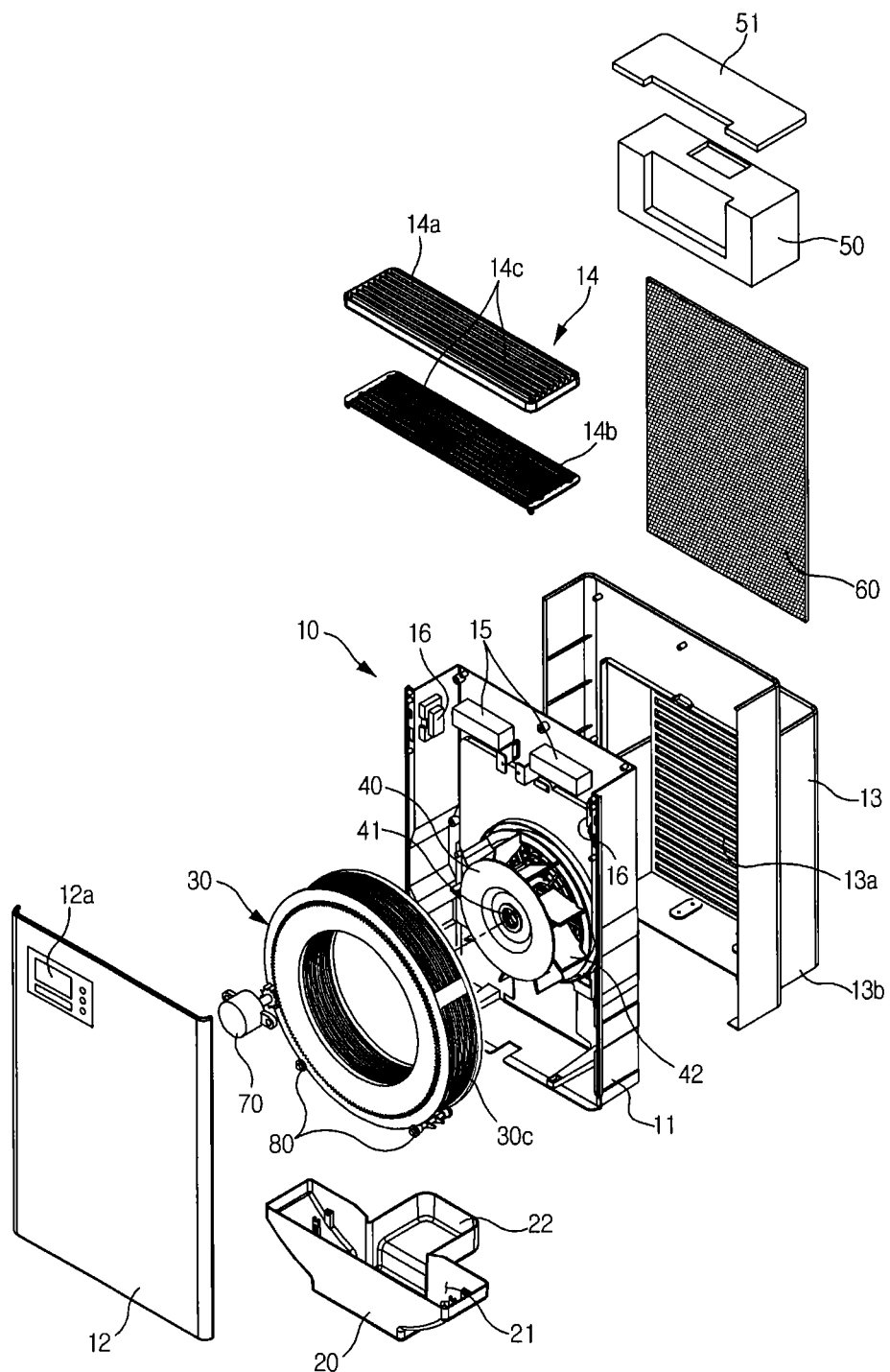
FIG. 2 is an exploded perspective view of the air cleaning humidifier of FIG. 1.

FIG. 1 is a perspective view illustrating the external appearance of an air cleaning humidifier in accordance with one embodiment of the present invention, and FIG. 2 is an exploded perspective view of the air cleaning humidifier of FIG. 1.

As shown in FIGS. 1 and 2, an air cleaning humidifier 1 in accordance with this embodiment includes a main body 10 forming the external appearance of the air cleaning humidifier 1, a tub 20 disposed within the main body 10 to contain water, a disc assembly 30 rotated under the condition that a part of the disc assembly 30 is disposed within the tub 20, and an air blower device 40 to blow air to the disc assembly 30.

The main body 10 includes a main body frame 11, a front cover 12 forming the external appearance of the front surface of the air cleaning humidifier 1, a rear cover 13 forming the external appearance of the rear surface of the air cleaning humidifier 1, and a discharge grill 14 forming air discharge holes 14c on the upper surface of the main body 10.

The main body frame 11 serves as a frame to support the entirety of the air cleaning humidifier 1. Various parts including the tub 20, the disc assembly 30, and the air blower device 40 are installed on the main body frame 11.

The tub 20 is a space to contain water, and a lower part of the disc assembly 30 is partially disposed within a water containing part 21 of the tub 20, and thus is soaked in water. That is, the disc assembly 30 is soaked in water stored in the water containing part 21 of the main body frame 11. Further, a water supply part 22 to receive water supplied from a water tank, which will be described later, is provided in the tub 20.

The disc assembly 30 has an approximately ring shape, and a detailed description thereof will be given later.

The air blower device 40 includes an air blower motor 41 to provide driving force, and an air blower fan 42 to receive the driving force from the air blower motor 41 and to generate a flow of air using the driving force. The air blower fan 42 generates an air current within the air cleaning humidifier 1 so as to inhale air through air suction holes 13a and then to discharge air through the air discharge holes 14c.

Heaters 15 may be installed on the upper portion of the main body frame 11. The heaters 15 serve to heat humidified air discharged to the outside, if necessary, so as to generate warm humidified air.

Further, a sterilization device 16 may be installed on each of both side surfaces of the upper portion of the main body frame 11. The sterilization devices 16 serve to exterminate noxious bacteria in the humidified air so as to discharge clean humidified air to the outside of the air cleaning humidifier 1.

The front cover 12 has an approximately rectangular shape, and is connected to the front surface of the main body frame 11. The external surface of the front cover 12 may be decorated with various pictures or designs. Further, a control part 12a to control operation of the air cleaning humidifier 1 is provided at the upper portion of the front cover 12.

The control part 12a is provided with various buttons, and thus allows a user to operate the air cleaning humidifier 1. The control part 12a may be manipulated in a touch type as well as in a button type.

The rear cover 13 is connected to the rear surface of the main body frame 11, and includes a water tank receipt part 13b to accommodate a water tank 50. A plurality of air suction holes 13a is formed through the rear cover 13, and dry indoor air is inhaled into the air cleaning humidifier 1 through the air suction holes 13a.

The water tank receipt part 13b is protruded from the rear surface of the rear cover 13 such that the upper surface of the water tank receipt part 13b is opened. An inner cover 13c is installed in the water tank receipt part 13b, and the water tank 50 is accommodated on the inner cover 13c in the water tank receipt part 13b.

The water tank 50 serves to store water necessary for humidification and then to supply a proper amount of the water to the water containing part 21 of the tub 20 via the water supply part 22 of the tub 20, and is mounted on the air cleaning humidifier 1 in a cassette type.

When the water tank 50 is mounted on the air cleaning humidifier 1, the upper surface of the water tank 50 is covered with a water tank cover 51. A filter 60 is installed on the rear inner surface of the water tank receipt part 13b. The filter 60 serves to filter out impurities from air introduced from the outside.

The discharge grill 14 is connected to the upper end of the main body 10, and is provided with the air discharge holes 14c. The discharge grill 14 includes an outer discharge grill part 14a installed on the outer side of the main body 10, and an inner discharge grill part 14b installed on the inner side of the main body 10.

Figure 3:
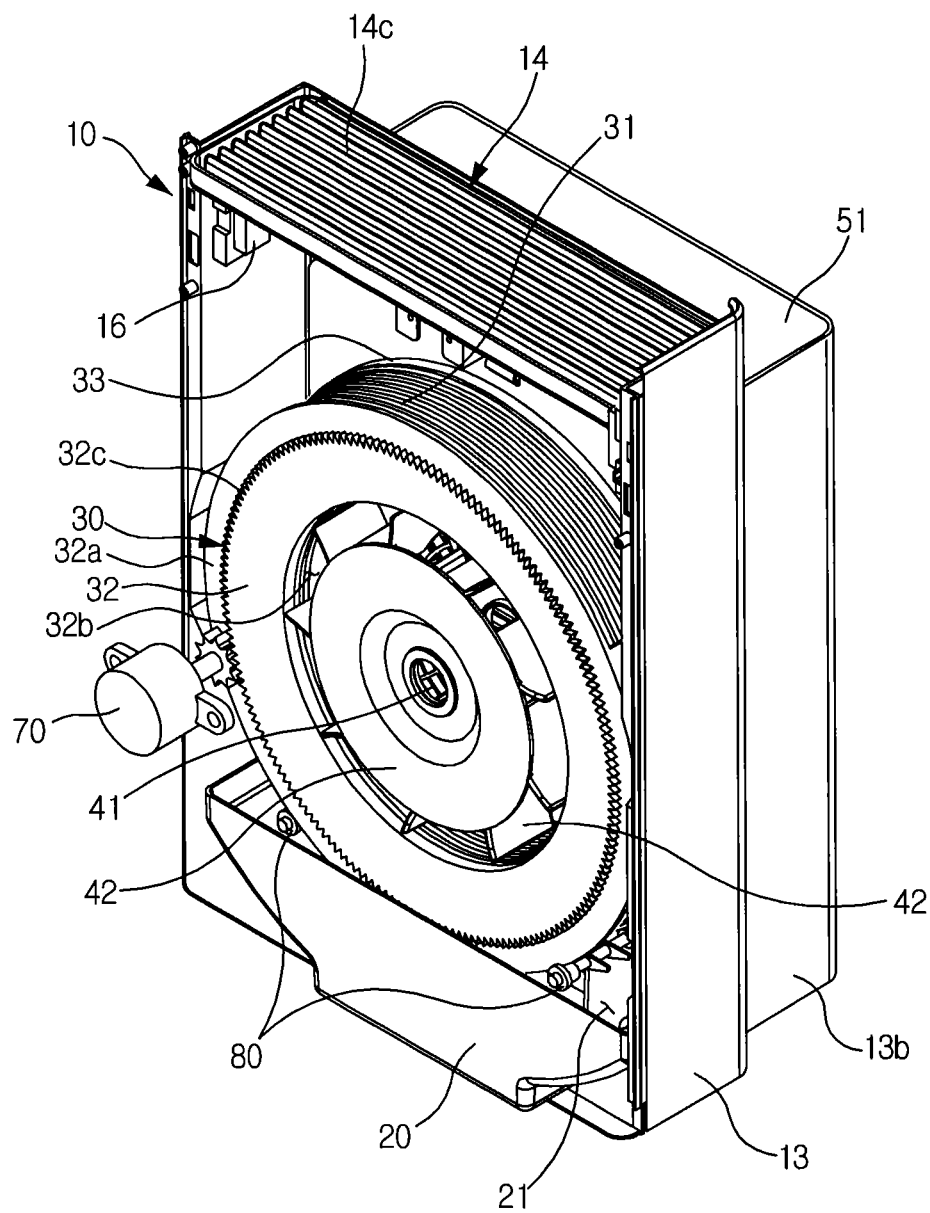
FIG. 3 is a perspective view illustrating the assembly state of a disc assembly in accordance with the embodiment.
Figure 4:
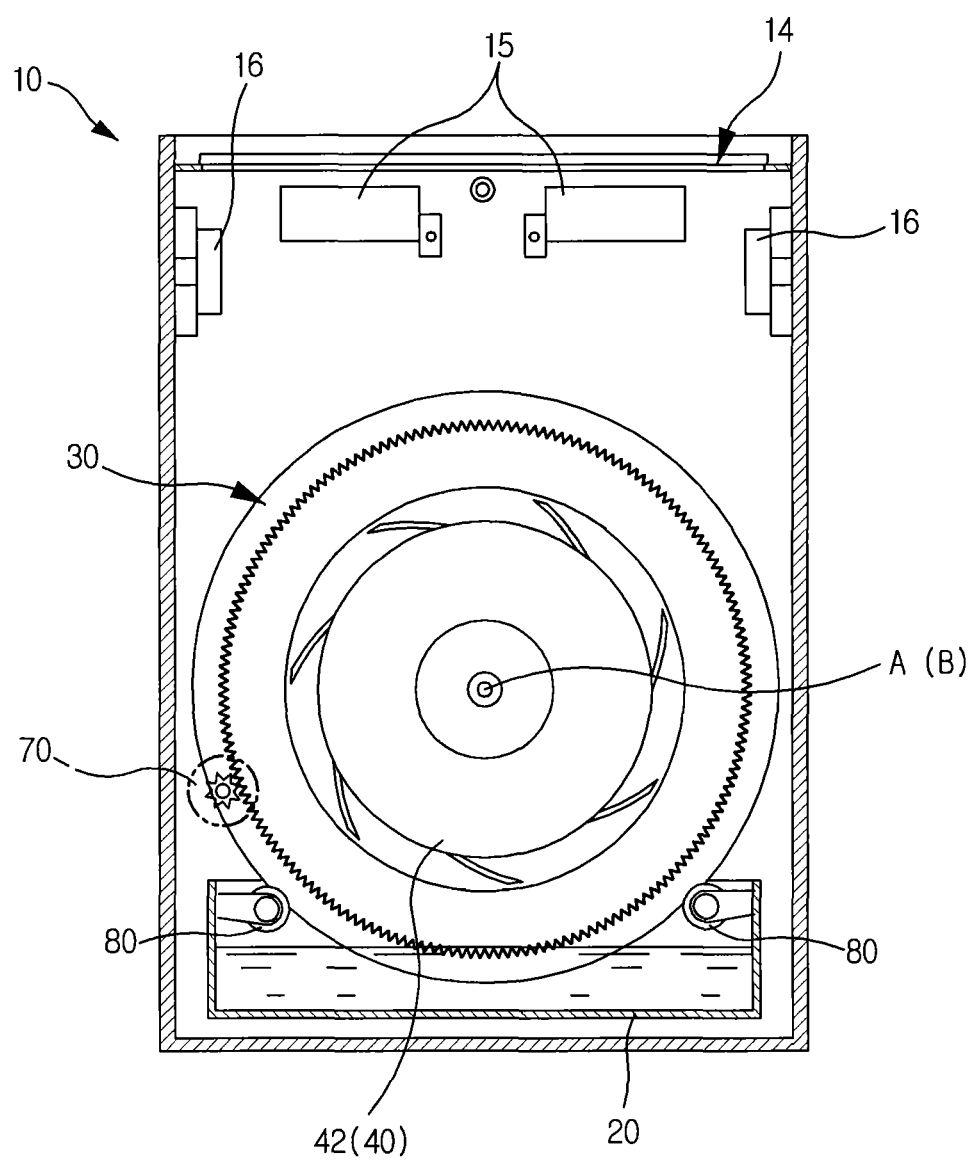
FIG. 4 is a front view of the disc assembly shown in FIG. 3.
Figure 5:
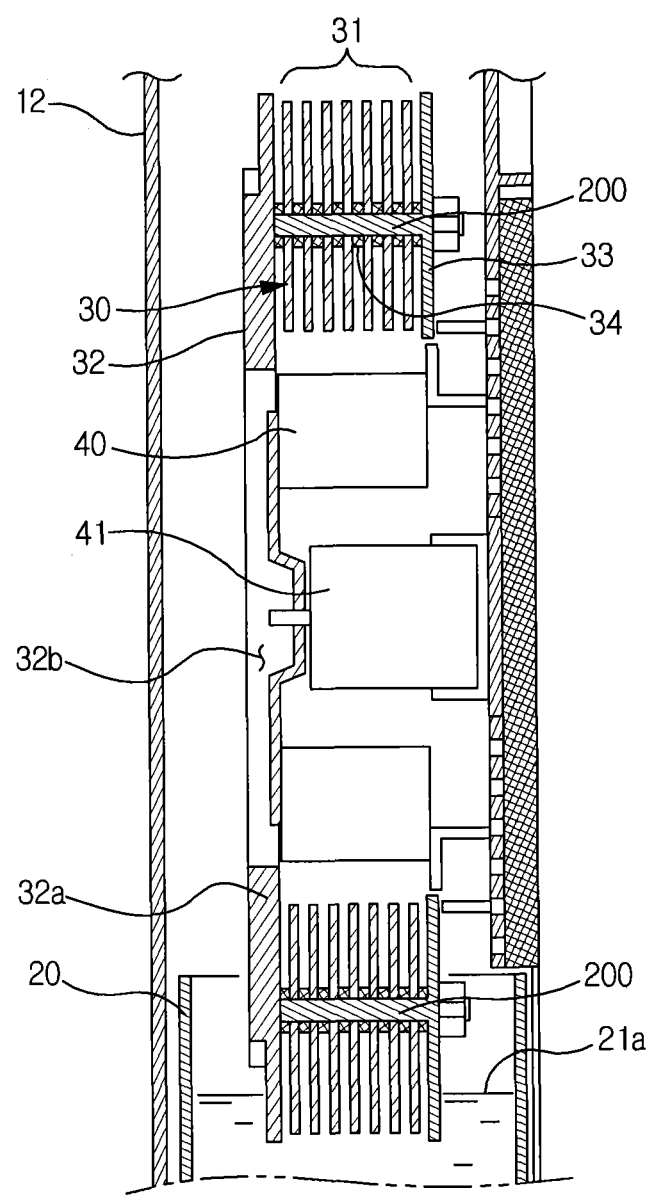
FIG. 5 is a longitudinal-sectional view of the disc assembly shown in FIG. 3.
Figure 6:
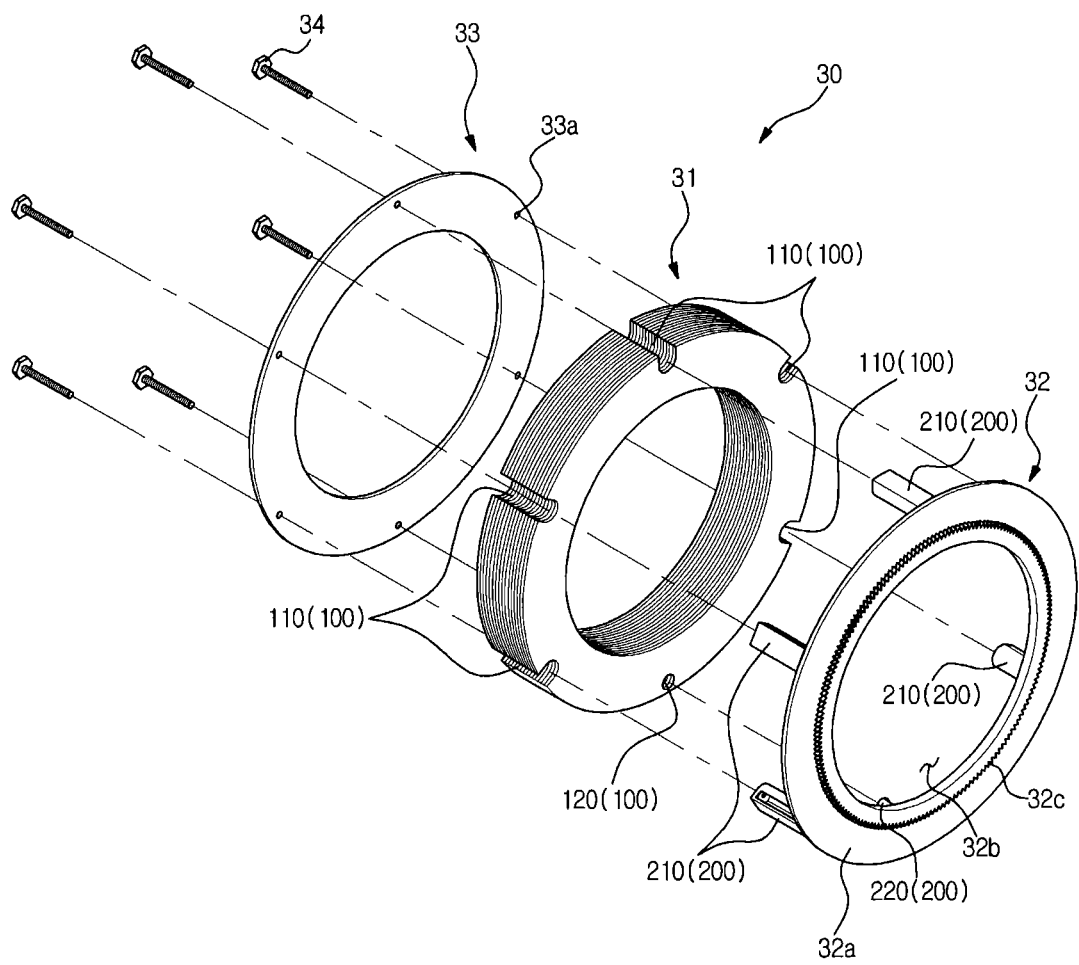
FIG. 6 is an exploded perspective view of the disc assembly shown in FIG. 3.

Next, with reference to FIGS. 3 to 6, a disc assembly in accordance with the embodiment will be described. FIG. 3 is a perspective view illustrating the assembly state of a disc assembly in accordance with the embodiment, FIG. 4 is a front view of the disc assembly shown in FIG. 3, FIG. 5 is a longitudinal-sectional view of the disc assembly shown in FIG. 3, and FIG. 6 is an exploded perspective view of the disc assembly shown in FIG. 3.

As shown in FIGS. 3 to 6, in the air cleaning humidifier 1 in accordance with this embodiment, the disc assembly 30 is disposed to surround the air blower fan 42 such that a center A of rotation of the disc assembly 30 is approximately the same as a center B of rotation of the air blower fan 42. Further, the disc assembly 30 is accommodated in the main body frame 11 such that the disc assembly 30 is overlapped with the air blower fan 42.

The disc assembly 30 includes a disc member 31 assembled by stacking discs, a first plate member 32 disposed at one side of the disc member 31, and a second plate member 33 disposed at the other side of the disc member 31.

The disc member 31 in accordance with this embodiment may serve as a humidification element, and be obtained by stacking several ring-shaped discs. The disc member 31 is approximately ring-shaped, and is provided with assembly parts 100 obtained by partially cutting the disc member 31 so as to be assembled with the first plate member 32 and the second plate member 33.

The assembly parts 100 may include at least one of recess parts 110, each of which is indented on the edge of the disc member 31, and hole parts 120, each of which is formed at one position on the surface of the disc member 31.

The recess parts 110 are formed by removing parts of the edge of the disc member 31, and the hole parts 120 are formed by removing parts of the surface of the disc member 31 except for the edge of the disc member 31.

If the assembly parts 100, such as the recess parts 110 or the hole parts 120, are formed on the ring-shaped disc member 31, when several disc members 31 are stacked, alignment for stacking of the disc members 31 may be easy, and when the first plate member 32 is inserted into the disc member 31, the first plate member 32 and the disc member 31 may be simply assembled without delicate manipulation.

Fixing members 200 are respectively connected to the recess parts 110 and the hole parts 120. These fixing members 200 will be described later.

Although the disc member 31 formed by stacking several ring-shaped discs is illustrated in the drawings, an integral disc, which is capable of holding water, may be used as the disc member 31 so long as the disc member 31 serves as a humidification element.

Further, although the disc member 31 provided with five recess parts 110 and one hole part 120 is illustrated in the drawings, the disc member 31 may be provided with only the recess parts 110 or only the hole parts 120, or one or plural recess parts 110 and one or plural hole parts 120 according to shapes of the disc member 31.

The first plate member 32 is disposed at one side of the disc member 31 on the main body frame 11 adjoining the front cover 12. The first plate member 32 includes a ring part 32a forming the ring-shaped external appearance of the first plate member 32, an opening 32b formed at the center of the ring part 32a, and a gear part 32c formed along the circumference of the ring part 32a.

The opening 32b having a greater diameter than the outer diameter of the air blower fan 42 is formed at the center of the ring part 32a. The air blower fan 42 is inserted into the opening 32b so as to be connected to the main body frame 11.

Further, the gear part 32c is connected to a driving unit 70, which will be described later. The gear part 32c receives rotary force transmitted from the driving unit 70, and then generates rotary force of the disc assembly 30.

The fixing members 200, which respectively pass through the assembly parts 100 of the disc member 31, are formed on the first plate member 32. The fixing members 200 may include at least one of first fixing members 210 inserted into the recess parts 110 of the disc member 31, and second fixing members 220 inserted into the hole parts 120 of the disc member 31.

Here, the fixing members 200 may be formed integrally with the first plate member 32, or may be manufactured separately from the first plate member 32 and then be connected to the first plate member 32.

The second plate member 33 is disposed at the other side of the disc member 31 on the main body frame 11 adjoining the rear cover 13. The second plate member 33 includes screw holes 33a formed at positions corresponding to the assembly parts 110 of the disc member 31 and the fixing members 200 of the first plate member 32. The screw holes 33a serve as intermediates during a process of connecting screws 34 to the fixing members 200.

Figure 7:
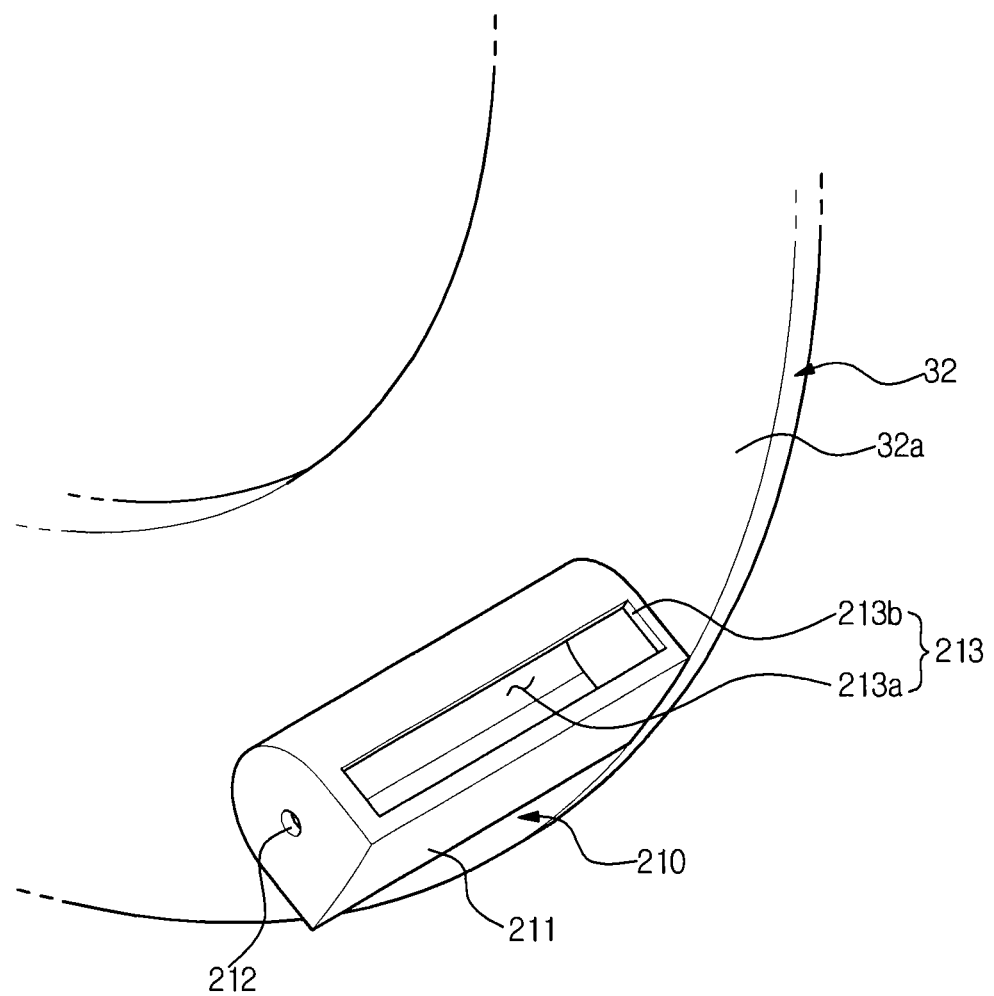
FIG. 7 is an enlarged view of a portion of the rear surface of a first plate member shown in FIG. 6.

FIG. 7 is an enlarged view of a portion of the rear surface of the first plate member shown in FIG. 6.

As shown in FIGS. 6 and 7, the first fixing members 210 are protruded from the edge of the ring part 32a of the first plate member 32 so as to be connected to the recess parts 110 of the disc member 31. The first fixing members 210 are inserted into the recess parts 110 of the disc member 31, and thus serve to maintain the assembly shape of the disc assembly 30.

Each of the first fixing members 210 includes a first protrusion part 211 protruded in the stacking direction of the disc member 31, a first screw connection part 212 formed through the first protrusion part 211 such that the screw 34 is connected thereto, and a first water storage part 213 formed by cutting a part of the first protrusion part 211.

The first protrusion part 211 has a rod shape protruded to a designated length, and is inserted into the recess part 110 of the disc member 31. The length of the first protrusion part 211 is approximately equal to the stacking thickness of the disc member 31.

The first water storage part 213 is a hollow structure formed in the first protrusion part 211 by cutting the part of the first protrusion part 211. The first water storage part 213 includes a water storage space 213a formed within the first protrusion part 211, and an entrance and exit hole 213b, through which water contained in tub 20 enters the water storage space 213a and then is discharged at a designated height to the outside of the water storage space 213a.

The entrance and exit hole 213b is formed to have a length corresponding to that of the recess part 110 by partially cutting the first protrusion part 211, and may have various shapes. That is, the entrance and exit hole 213b of the first water storage part 213 in accordance with this embodiment is not limited to a rectangular shape formed by partially cutting the rod-shaped first protrusion part 211, as shown in FIGS. 6 and 7.

Here, the shape of the entrance and exit hole 213b depends on at which height of the air cleaning humidifier 1 is water stored in the water storage space 213 discharged to the disc member 31 through the entrance and exit hole 213b during a process of rotating the disc assembly 30.

Figure 8:
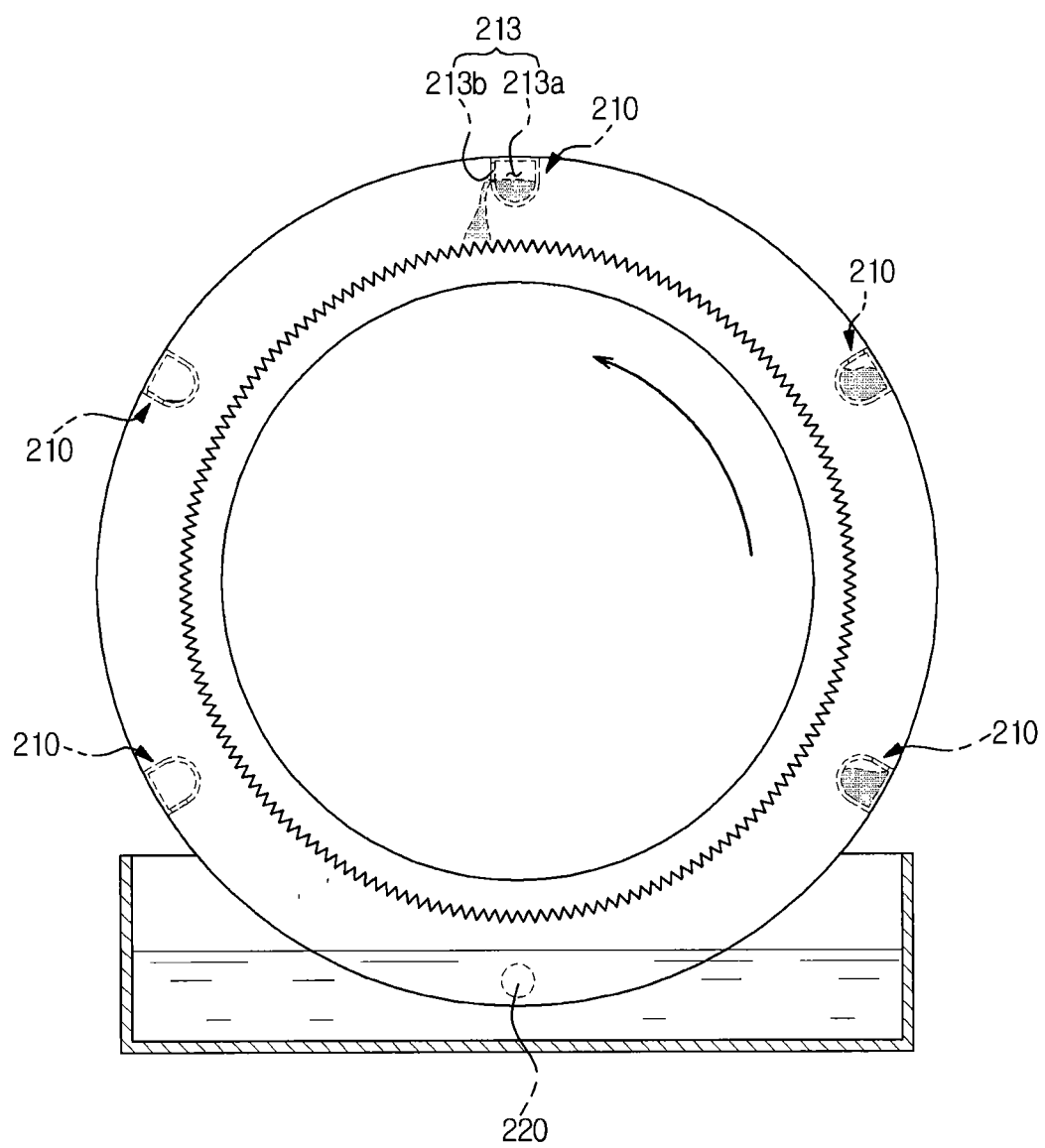
FIGS. 8 and 9 are view illustrating discharge positions of water stored in a water storage part according to shapes of an entrance and exit hole.
Figure 9:
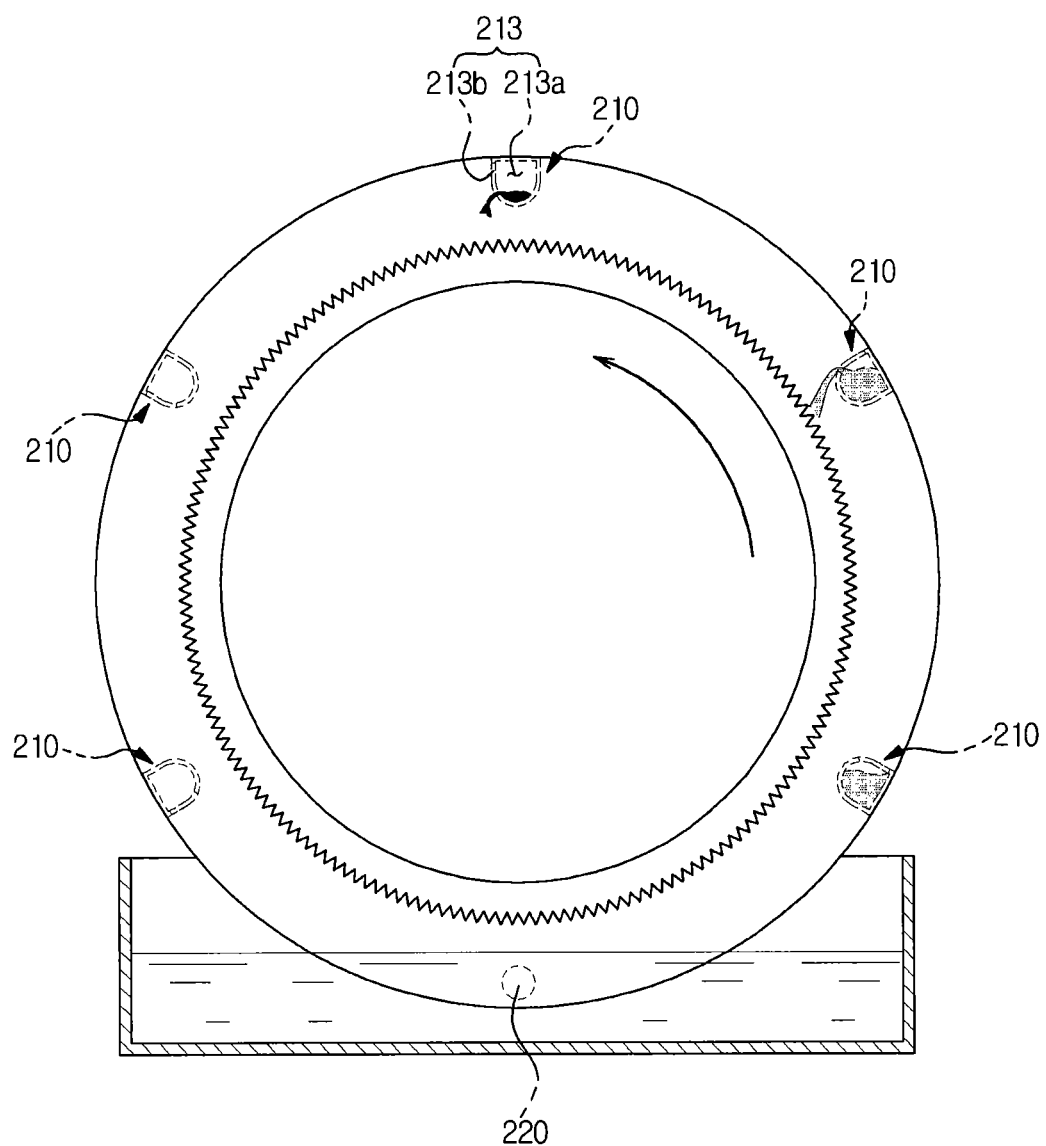

That is, if the entrance and exit hole 213b is formed in a shape, as shown in FIG. 8, water stored in the water storage space 213a from the uppermost region of the air cleaning humidifier 1 is discharged to the disc member 31. Further, if the entrance and exit hole 213b is formed in a shape, as shown in FIG. 9, water stored in the water storage space 213a from a region located at a lower position that the uppermost region of the air cleaning humidifier 1 is discharged to the disc member 31.

Therefore, the entrance and exit hole 213*b* is provided in various shapes according to at which position or height of the air cleaning humidifier 1 does the disc member 31 hold little water, thereby being capable of discharging water to the disc member 31.

In the process of rotating the disc assembly 30, when the first water storage part 213 is soaked in water contained in the tub 20, the water in the tub 20 enters the first water storage part 213 through the entrance and exit hole 213*b*, and when the first water storage part 213 is located at more than a designated height, the water in the first water storage part 213 is discharged to the disc member 31 through the entrance and exit hole 213*b* and thus soaks the surface of the dry disc member 31 again so as to increase a humidify amount.

Although five fixing members 210 are protruded from the edge of the ring part 32*a* of the first plate member 32 so as to be connected to the five recess parts 110 formed on the disc member 31, the number of the fixing members 210 is not limited thereto but may be various.

Figure 10:
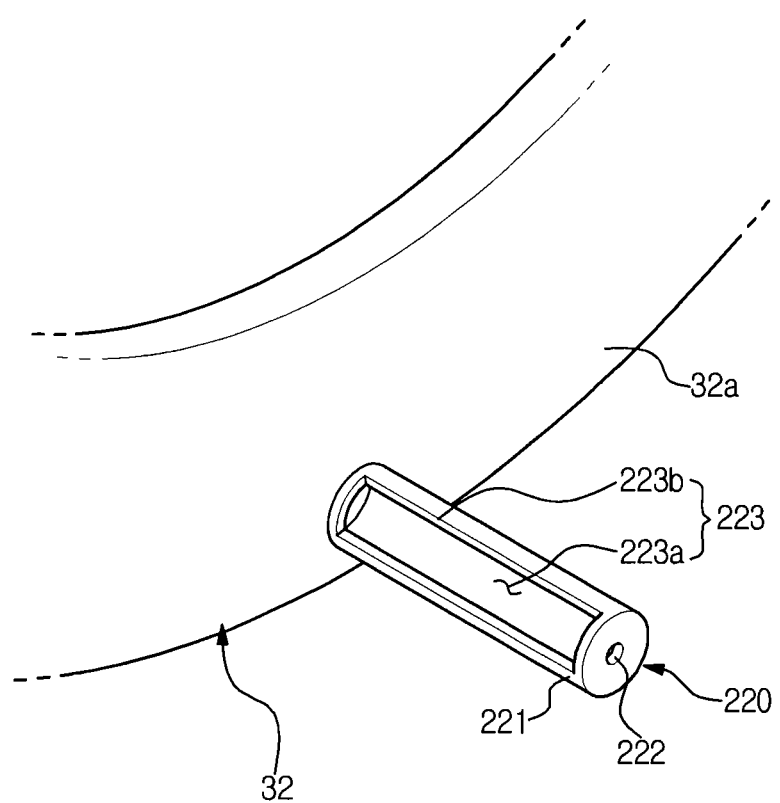
FIG. 10 is an enlarged view of another portion of the rear surface of the first plate member shown in FIG. 6.

Further, as shown in FIGS. 6 and 10, the second fixing members 220 are protruded from the surface of the ring part 32*a* of the first plate member 32 so as to be connected to the hole parts 120 of the disc member 31. The second fixing members 220 are protruded in the stacking direction of the disc member 31 and pass through the hole parts 120, and thus serve to fix the disc member 31.

Each of the second fixing members 220 includes a second protrusion part 221 protruded in the stacking direction of the disc member 31, a second screw connection part 222 formed through the second protrusion part 221 such that the screw 34 is connected thereto, and a second water storage part 223 to store a part of water contained in the tub 20.

The second protrusion part 221 has a rod shape protruded to a designated length, and is inserted into the hole part 120 of the disc member 31. The length of the second protrusion part 221 is approximately equal to the stacking thickness of the disc member 31.

The second water storage part 223 is a hollow structure formed in the second protrusion part 221 by partially cutting the second protrusion part 221, in the same manner as the first water storage part 213. Further, the second water storage part 223 includes a water storage space 223*a* formed within the second protrusion part 221, and an entrance and exit hole 223*b*, through which water stored in tub 20 enters the water storage space 223*a* and then is discharged at a designated height to the outside of the water storage space 223*a*.

Therefore, in the process of rotating the disc assembly 30, when the second water storage part 223 is soaked in water contained in the tub 20, the water in the tub 20 enters the second water storage part 223 through the entrance and exit hole 223*b*, and when the second water storage part 223 is located at a designated height, the water in the second water storage part 223 is discharged to the disc member 31 through the entrance and exit hole 223*b*.

However, although the drawings illustrate that both the first and second fixing members 210 and 220 respectively include the first and second water storage parts 213 and 223, the first fixing members 210 may respectively include only the first protrusions 211 without the first water storage part 213, and the second fixing members 220 may respectively include only the second protrusions 221 without the second water storage part 223.

On the other hand, although the drawings illustrate that the fixing members 200 are formed on the first plate member 32 and then are screw-connected to the second plate member 33, the fixing members 200 may be formed on the second plate member 33 and then be screw-connected to the first plate member 32.

Further, spacers may be formed between the disc assembly 30 and the first plate member 32 and between the disc assembly 30 and the second plate member 33, thus being capable of adjusting an interval between the disc assembly 30 and the first plate member 32 and an interval between the disc assembly 30 and the second plate member 33.

The above-described disc assembly 30 is connected to the driving unit 70 to generate rotary force of the disc assembly 30. The driving unit 70 includes a driving motor and a driving gear, and the driving gear is connected to the gear part 32*c* of the first plate member 32.

The driving force of the driving unit 70 is transmitted to the disc assembly 30 by engaging the driving gear of the driving unit 70 with the gear part 32*c* of the first plate member 32.

The driving gear may be located below the center A of rotation of the disc assembly 30. Because the above position of the driving gear prevents interference of the disc assembly 30 with the driving unit 70, when the disc assembly 30 is installed in the air cleaning humidifier 1 or is separated from the air cleaning humidifier 1.

Further, support members 80 to support the disc assembly 30 may be provided in the tub 20. The support members 80 may be detachably disposed at both sides of the inside of the tub 20. The support members 80 are rotatably provided, and serve to guide the disc assembly 30 such that the disc assembly 30 is more stably rotated by the driving gear as well as to support the disc assembly 30.

Hereinafter, with reference to FIGS. 2, 4, 6, and 8, operations of the air cleaning humidifier and the disc assembly thereof in accordance with the embodiment will be described.

First, water stored in the water tank 50 of the air cleaning humidifier 1 is supplied to the tub 20. The water supplied from the water tank 50 is stored in the water containing part 21 via the water supply part 22. Here, the amount of the water in the water containing part 21 may be adjusted such that the water reaches a designated water level 21*a*. Further, a part of the ring-shaped disc assembly 30 is located under the water level 21*a* in the tub 21, and thus is soaked in the water in the tub 21.

When a user selects an air cleaning and humidification mode through the control part 12*a*, the air blower fan 42 and the disc assembly 30 are simultaneously driven, and cleaned air is discharged from the air discharge holes 14*c* via the disc assembly 30 to the outside.

Now, a process of performing the air cleaning and humidification mode will be described in detail. The driving force generated from the driving unit 70 is transmitted from the driving gear 72 to the disc assembly 30, and thus the disc assembly 30 is rotated.

Further, since the air blower fan 42 is inserted into the opening 32*b* of the first plate member 32, the disc assembly 30 is rotated around the air blower fan 42. The rotation of the air blower fan 42 generates an air current in the air cleaning humidifier 1. Through such an air current, air is inhaled into the air cleaning humidifier 1 through the air suction holes 13*a* formed through the rear surface of the air cleaning humidifier 1, is inhaled to the air blower fan 42 via the filter 60, passes through the disc assembly 30, and then is discharged to the outside.

That is, the air blower fan 42 and the disc member 31 are overlapped with each other, and thus the air current discharged from the air blower fan 42 is blown to the disc assembly 30. While the blown air passes through the disc member 31, water held by the disc member 31 is evaporated.

The obtained humidified air is discharged from the main body 10 to the outside through the air discharge holes 14c.

At this time, when the disc assembly 30 is rotated, water contained in the tub 20 is lifted up by the first water storage parts 213 of the first fixing members 210. Then, when one first water storage parts 213 is located at a designated height, water stored in the water storage space 213a is discharged to the disc member 31 through the entrance and exit hole 213b, and thus allows the disc member 31 to hold a larger amount of water.

Therefore, since the disc member 31 has a more improved moisture containing capacity during air humidification caused by the rotation of the disc assembly 30, more effective air humidification may be achieved.

As is apparent from the above description, in an air cleaning humidifier 1 and a disc assembly 30 thereof in accordance with one embodiment of the present invention, fixing members 200 inserted into assembly parts 100 of a disc member 31 to maintain an assembly shape of the disc assembly 30 respectively include water storage parts to store water so as to discharge water to the disc member 31, thereby more effectively achieving air humidification.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disc assembly of an air cleaning humidifier comprising:
    a disc member provided with assembly parts formed by cutting parts of the disc member;
    first and second plate members respectively disposed at both sides of the disc member;
    at least one fixing member inserted into a corresponding one of the assembly parts between the first and second plate members to fix the disc member; and
    water storage parts formed in the at least one fixing member.

2. The disc assembly according to claim 1, wherein:
    each of the assembly parts includes at least one of a recess part indented on the edge of the disc member, and a hole part formed on the surface of the disc member; and
    each of the at least one fixing member includes at least one of a first fixing member corresponding to the recess part, and a second fixing member corresponding to the hole part.

3. The disc assembly according to claim 2, wherein the water storage parts include a first water storage part formed in the first fixing member, and a second water storage part formed in the second fixing member.

4. A disc assembly of an air cleaning humidifier comprising:
    a ring-shaped disc member formed by stacking a plurality of discs;
    first and second plate members respectively disposed at both sides of the disc member;
    at least one fixing member formed integrally with any one of the first and second plate members to fix the disc member;
    water storage parts formed in the at least one fixing member; and
    entrance and exit holes, through which water respectively enters and leaves the water storage parts.

5. The disc assembly according to claim 4, wherein the first plate member includes a ring part forming a ring-shaped external appearance of the first plate member, an opening formed at the center of the ring part, and a gear part formed along the circumference of the ring part.

6. The disc assembly according to claim 4, wherein the disc member includes at least one recess part to accommodate the at least one fixing member.

7. The disc assembly according to claim 6, wherein the at least one recess part is indented on the edge of the disc member.

* * * * *